UNITED STATES PATENT OFFICE.

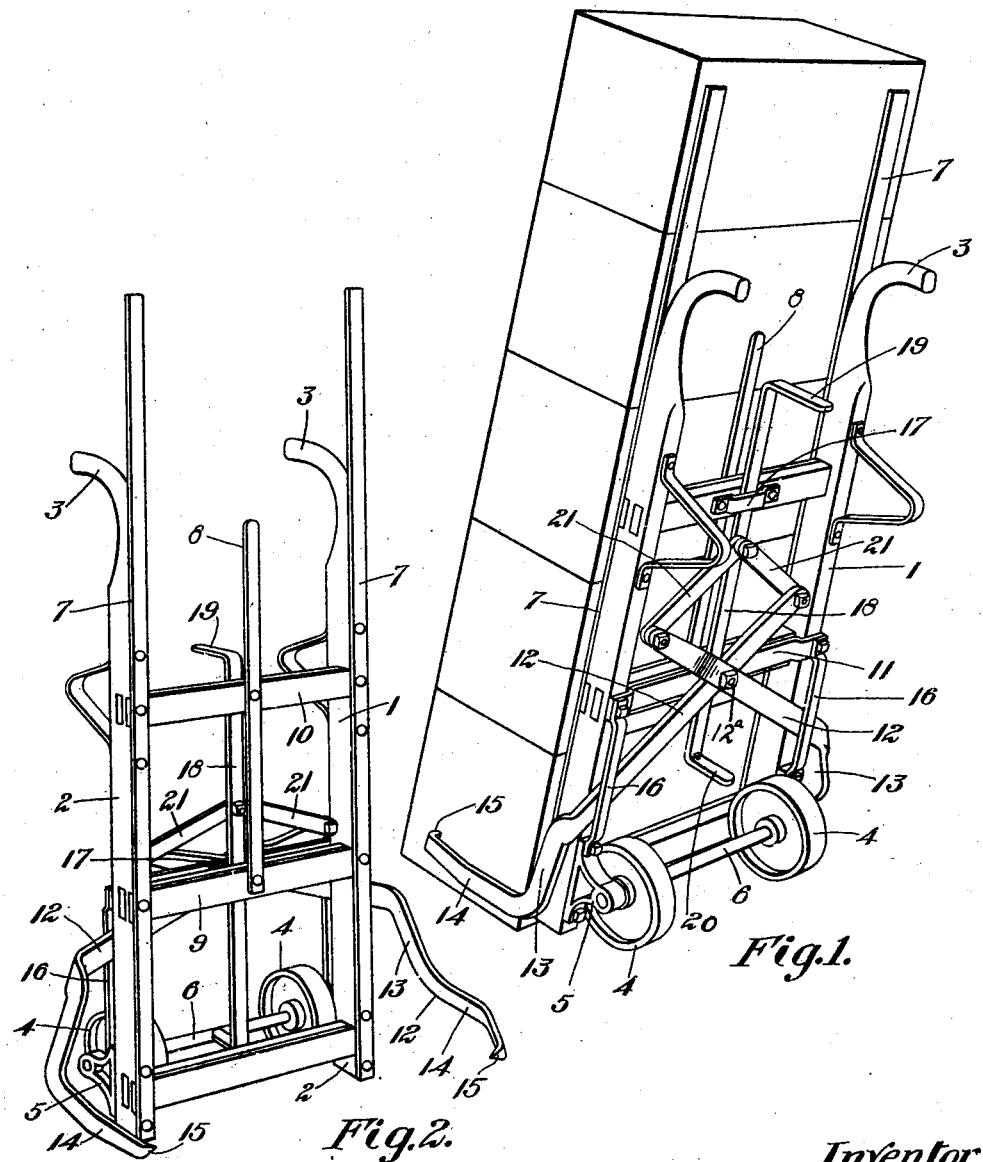

WILLIAM HOLLAN ARCHIBALD, OF VERNON, BRITISH COLUMBIA, CANADA, ASSIGNOR OF ONE-HALF TO ELMER E. SAMSON, OF VERNON, CANADA.

HAND-TRUCK.

979,053.      Specification of Letters Patent.      Patented Dec. 20, 1910.

Application filed March 21, 1910. Serial No. 550,613.

*To all whom it may concern:*

Be it known that I, WILLIAM HOLLAN ARCHIBALD, a citizen of the United States of America, and resident of Vernon, in the Province of British Columbia, in the Dominion of Canada, have invented certain new and useful Improvements in Hand-Trucks, of which the following is a specification.

The invention relates to improvements in hand trucks, as described in the following specification and illustrated in the accompanying drawings that form part of the same.

The invention consists essentially in the novel construction and arrangement of parts, whereby the box or article to be carried on the truck is clamped securely by a pair of tong shaped arms pivotally connected to the truck frame and whereby said arms are swung upon their pivots to release the box.

The objects of the invention are, to obviate the difficulties and disadvantages incident to the use of the old square point style of truck, to effect a saving of time and labor in handling boxes and small packages, to obviate the loss through damage to fruit packed in cases, and to devise a simple, strong and durable form of truck which may be produced at low cost and be easy to operate.

In the drawings, Figure 1 is a perspective view of my truck from the rear showing a pile of boxes being carried thereby. Fig. 2 is a perspective front view of the truck shown ready to seize a load.

Like numerals of reference indicate corresponding parts in each figure.

Referring to the drawings, 1 is a truck frame of any ordinary design and style having the side arms 2 with the handles 3 at the upper ends thereof and the wheels 4 supported from the brackets 5 on the axle 6.

The lower ends of the side arms 2 are preferably cut off square and in alinement with the periphery of the wheels 4 so that the truck will stand upon the ends of said arms.

7 are metal strips secured to the upper sides of the arms 2 extending outwardly beyond the handles 3 and forming guides.

8 is a short strip secured to the front or upper edges of the cross bars 9 and 10 of the truck frame mid-way of their width and extending beyond the cross bar 10.

11 is a metal bar extending between the side arms 2 beneath the cross bar 9 and rigidly secured at the ends to said side arms.

12 are a pair of clamp members pivotally secured together adjacent to one end and to the bolt 12ª rigidly secured to the cross bar 11 centrally of its width and extending outwardly and forwardly and bent upwardly at 13 to the outside of the side arms 2 and having the portions 14 extending outwardly in a direction substantially perpendicular to the top of the truck, said outer ends having the inturned points 15 adapted to grip the ends of the boxes to be moved.

16 are guide strips rigidly secured to the underside or back edges of the side arms 2 and extending over the clamp members 12 and holding said clamp members from bending backward.

17 are metallic brackets fixedly secured to the undersides of the cross bars 9 and 10 centrally of their width and forming lateral slots.

18 is a bar of flat metal extending through the slots formed by the brackets 17 and having rearwardly or down turned ends 19 and 20, said bar sliding freely longitudinally in said slots.

21 are a pair of links pivotally secured together and to the bar 18 intermediate of its length and between the brackets 17, said links being pivotally connected at their other ends to the inner ends of the clamp members 12.

In the use of this device, the bar 18 is pushed downwardly by grasping the projection 19 by the hand or pushing on the projection 20 with the foot. The downward movement of the bar 18 throws the links 21 outwardly, thereby swinging the clamp members 12 upon their pivot and throwing the outer ends 14 outwardly, as shown in Fig. 2. The truck is then wheeled up to a pile of boxes or other packages and the rod 18 pulled upwardly to swing the clamp members 12 inwardly. The inward movement of the clamp members 12 may be very sharp so that the points 15 of the said clamp members will sink into the ends of the lower box of the pile. The truck is then tipped slightly backward and the lower box is thus securely held by the clamping arms. The weight of the boxes drawing downwardly on the clamp members 12 causes said clamp members to grip very securely so that the boxes cannot possibly slip. The truck may be wheeled about as desired, the boxes resting against the strips 7 and 8.

In depositing the boxes or other packages carried on the truck, the said truck is merely allowed to tip forward until the bottom box rests on the floor or ground and as the weight of the boxes draws the arms 12 down slightly below the end of the truck when loaded, on the landing of the said boxes the arms 12 will be swung outwardly automatically to clear the same and the truck may be withdrawn.

It will be seen from this description that the device is very simple and that it will cost very little to manufacture. The parts are so constructed that they may be attached to one of the ordinary old style square point or platform trucks, it being merely necessary to remove the platform member from the nose of the truck and attach the bars to the back. The gripping arms will automatically adjust themselves if the operator does not bring the truck perpendicularly up to the pile of boxes, as the bar 18 is free to move laterally in the lateral slots in the brackets 17, consequently the said clamping members will swing to accommodate themselves to the relative location of the ends of the boxes. Further, many different widths of packages may be handled as the arms 12 have a very wide range.

The many advantages in using a clamping truck for the handling of fruit cases are well known and the simplicity, strength and durability of my invention will be readily apparent from the foregoing description. This form of truck may be readily adapted for use in handling sacks and other forms of packages, it being merely necessary to change the shape of the gripping ends of the arms 12.

What I claim as my invention is:—

1. In a hand truck, a frame supported on suitable wheels, a pair of tong shaped arms pivotally connected together, the pivot being rigidly secured to said frame, and means for swinging said arms on their pivot.

2. In a hand truck, a frame supported on suitable wheels, a pair of arms pivotally secured together adjacent to one end and having outwardly and forwardly extending portions adapted to grip the packages to be carried, the pivot of said arms being rigidly secured to said frame and means connected to the inner ends of said arms for swinging them on their pivot.

3. In a hand truck, a frame supported on suitable wheels, a rigid cross bar extending between the sides of said frame intermediate of their length, a bolt or pin rigidly secured to said cross bar mid-way of its length, a pair of arms pivotally supported intermediate of their length on said bolt or pin, said arms extending angularly outward and forward from their pivot and having extension ends arranged perpendicular to the main portions, said perpendicular ends being adapted to grip the packages, and means connected to the inner ends of said arms for swinging them on their pivots.

4. In a hand truck, a frame having a pair of side arms and cross bars rigidly connecting said side arms, a pair of tong shaped arms pivotally secured to a rigid pivot extending from one of said cross bars adjacent to their inner ends and extending angularly outward and forward and having upturned portions extending substantially parallel with the sides of said frame and portions extending substantially perpendicular to said upturned portions, said perpendicular portions being adapted to grip the packages at their forward ends, and means connected to the inner ends of said arms for swinging them on their pivots.

5. In a hand truck, a frame having a pair of side arms and cross bars connecting the said side arms, a pair of clamp members pivotally secured together and to a rigid pivot pin extending from one of said cross bars, guide strips secured to the under edge of said side arms and extending over said clamp members, and means connected to the inner ends of said clamp members for swinging them on their pivots.

6. In a hand truck, a frame having a rigid cross bar arranged intermediate of its length, a pair of clamp arms pivotally secured together and to said cross bar, a bar slidably arranged in said frame, and a pair of links pivotally connected together and to said slidable bar at one end and at their other ends pivotally connected to the inner ends of said clamp arms.

7. In a hand truck, a frame having side arms and a plurality of cross bars rigid therewith, a pair of clamp arms pivotally secured together adjacent to their inner ends and extending outwardly and forwardly therefrom, a pair of brackets rigidly secured to said cross bars and forming laterally arranged slots, a bar slidable in the slots formed by said brackets and adapted to move laterally therein and having handle portions formed at the ends thereof, and a pair of links pivotally connected to said bar intermediate of its length and extending outwardly and pivotally connected to the inner end of said clamp arms.

8. In a hand truck, the combination with a rigid frame, a pair of clamping tong-shaped arms supported on a pivot rigidly secured to said frame, and a toggle mechanism adapted to swing said arms on their pivot.

Signed at the city of Vernon, British Columbia, Canada, this second day of March 1910.

WILLIAM HOLLAN ARCHIBALD.

Witnesses:
  REGINALD H. ROGERS,
  WILLIAM E. REINHARD.